United States Patent [19]

Kubota

[11] Patent Number: 5,666,713

[45] Date of Patent: Sep. 16, 1997

[54] CHASSIS COUPLING AND FIXING STRUCTURE AND METHOD OF ASSEMBLING THE CHASSIS

[75] Inventor: Yasuhiro Kubota, Tokyo, Japan

[73] Assignee: NEC Corporation, Tokyo, Japan

[21] Appl. No.: 447,029

[22] Filed: May 22, 1995

[30] Foreign Application Priority Data

May 26, 1994 [JP] Japan ................................ 6-112496

[51] Int. Cl.$^6$ ................................................ B23P 11/02
[52] U.S. Cl. ...................... 29/525.01; 403/331; 312/111; 29/243.5
[58] Field of Search .................. 29/525.01, 525.03, 29/243.5; 312/111, 265.6, 264; 403/331, 381, 401, 402

[56] References Cited

U.S. PATENT DOCUMENTS 2,233,480  3/1941  Jonas ................................. 312/111
3,751,127  8/1973  Black, Jr. et al. .................. 312/111
3,841,725  10/1974  Dorner ............................. 312/111 X

FOREIGN PATENT DOCUMENTS 3103605  4/1991  Japan ................................. F16B 5/02
278212   of 1952  Switzerland ........................... 403/381

*Primary Examiner*—Peter Vo
*Assistant Examiner*—Khan Nguyen
*Attorney, Agent, or Firm*—Sughrue, Mion, Zinn, Macpeak & Seas

[57] ABSTRACT

In order to couple and fix a first chassis and a second chassis, the first chassis is positioned relative to the second chassis. Then, coupling members are inserted into pairs of first and second coupling grooves, respectively. The first chassis has the first coupling grooves provided in upper portions of the first chassis and extending from a front wall along side walls, respectively, and the second chassis having second coupling grooves provided in lower portions of the second chassis and extending from a front wall along side walls, respectively. Finally, the coupling members are fixed to both of the first chassis and the second chassis.

11 Claims, 10 Drawing Sheets

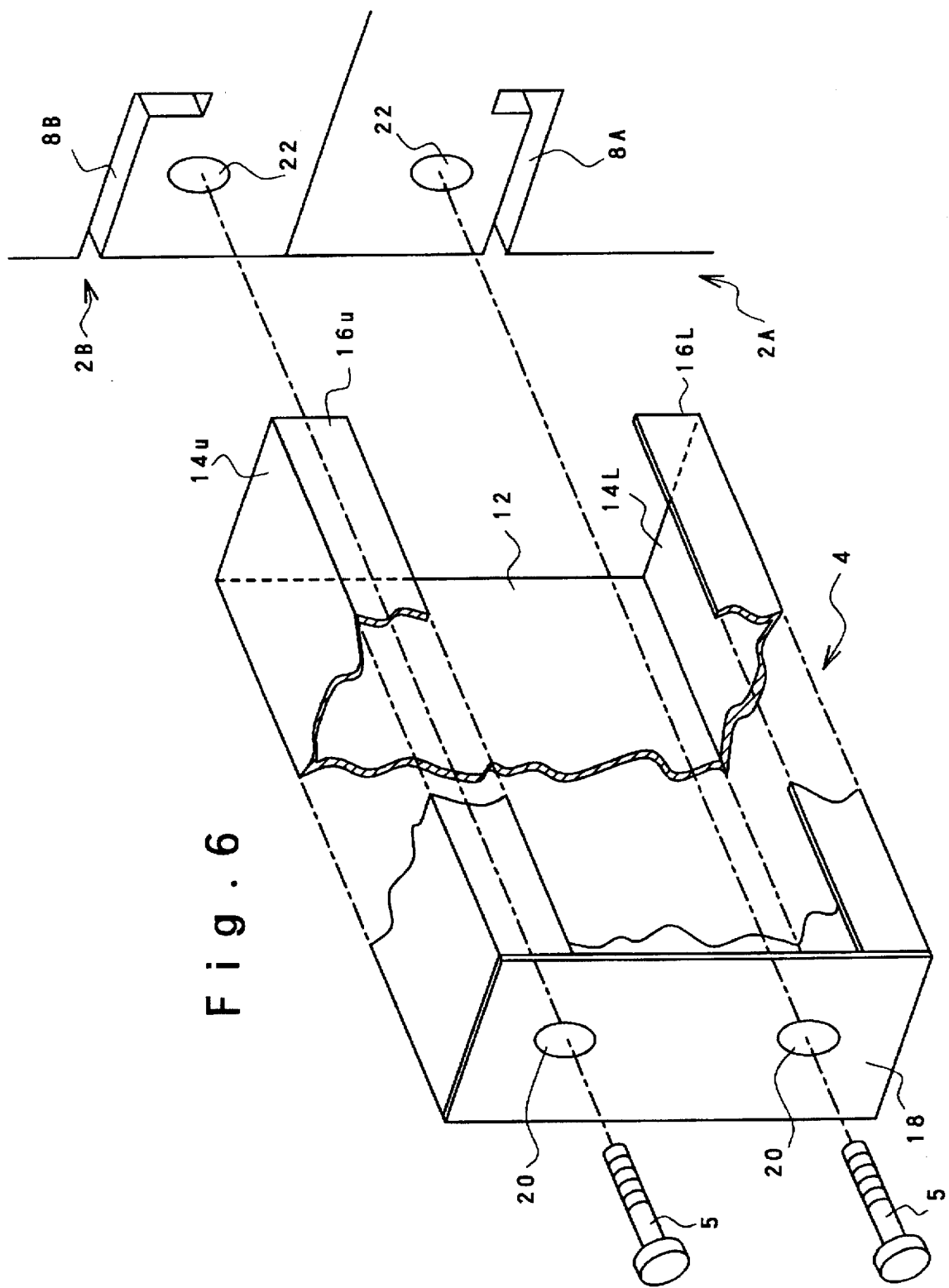

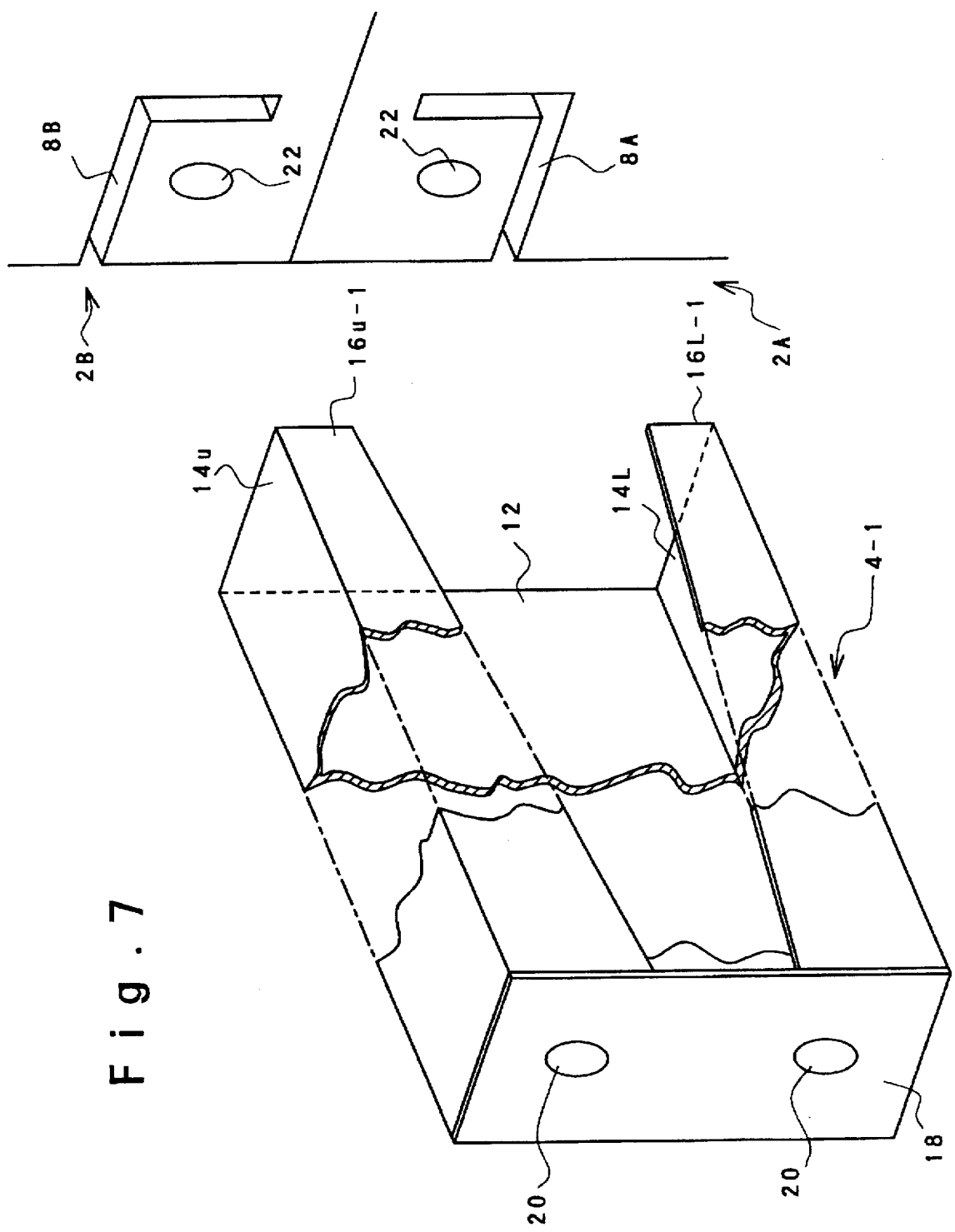

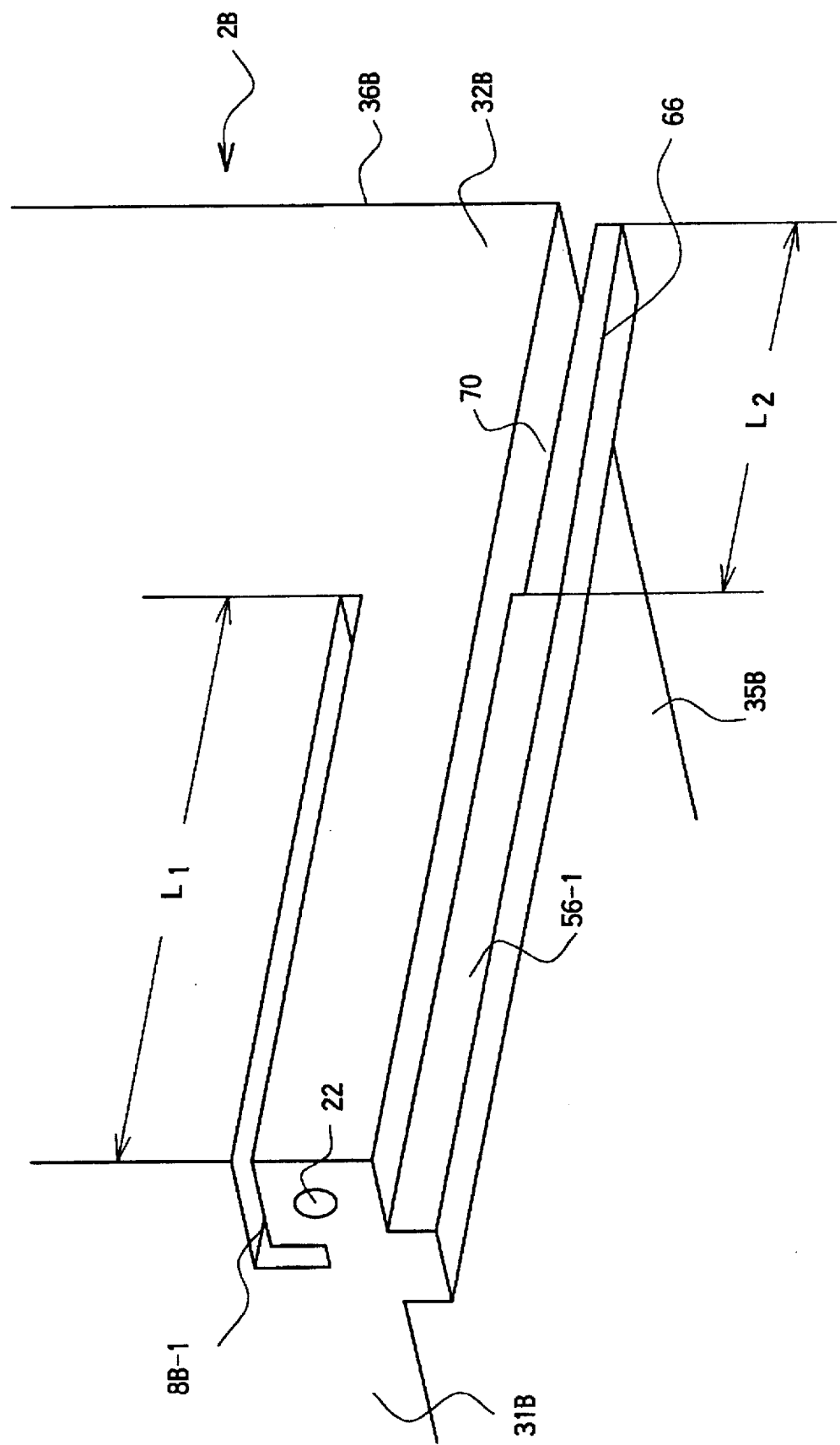

CHASSIS COUPLING AND FIXING STRUCTURE AND METHOD OF ASSEMBLING THE CHASSIS

BACKGROUND OF THE INVENTION

1. Field of the Invention

The present invention relates to a structure for coupling and fixing two chassis of a box shape, and more particularly, to a structure for stacking a chassis on another chassis in a building block system and coupling and fixing the chassis to each other.

2. Description of the Related Art

There was conventionally proposed a type of coupling and fixing structure of chassis of a box shape. Such a structure is disclosed in, for example, Japanese Laid-Open Patent Disclosure (JP-A-Hei3-103605). The coupling and fixing structure of a box shape of chassis will be described below with reference to FIGS. 1 to 3B.

Referring to FIG. 1, the chassis coupling and fixing structure includes two chassis 250A and 250B to be coupled. The chassis 250A and 250B are mainly constructed of front walls 261A and 261B, right side walls 262A and 262B, left side walls 263A and 263B, top plates 264A and 264B, bottom plates 265A and 265B, and rear walls 266A and 266B, respectively. Two convex portions 254A are provided at end portions of the top plate 264A of a chassis 250A in a horizontal direction on the side of the front wall 261A, respectively. Each of the convex portions 254A is of a rectangular block manner. The chassis 250B has two concave portions 253B provided on end portions of the bottom plate 265B of the chassis 250B in a horizontal direction on the side of the front wall 261B in correspondence to the convex portions 254A. Each of the convex portions 254A has a hole 256A penetrating from the front side to the rear side and each of the concave portions 253A has a tapped hole 256A on a position corresponding to the hole 256A. Screws 255 couple the chassis 250A and 250B to each other. Additionally, the chassis 250A has two tapped holes 257A provided within the chassis 250A in the end portion of the top plate 264A in the horizontal direction on the rear wall 266A side and the chassis 250B has two holes corresponding to the holes 257A and provided within the chassis 250B on the end portions of the bottom plate 265B in the horizontal direction o the rear wall 266b side.

More particularly, referring to FIG. 2, the convex portion 254A provided at a corner of the left side wall 263A and the front wall 261A on the top plate 264A of the chassis 250A has a top plate 274A parallel to the top plate 264A of the chassis 250A, a first side wall 273A straightly extending from the side wall 263A of the chassis 250A, and a front wall 271A straightly extending from the front wall 261A of the chassis 250A. A rear wall 276A of the convex portion 254A extends vertically and upward from the top plate 264A of the chassis 250A. A second side wall 272A of the convex portion 254A extends vertically and downward from the top plate 274A and is bent in a direction of the first side wall 273A on the way and further extends vertically and downward to the top plate 264A again. The bent portion 258A is inclined upward in a direction from the front wall 271A to the rear wall 276A. The convex portion has a hole 256A penetrating from the front wall 271A to the rear wall 276A. Such convex portions 254A are provided at corners between the right side wall 262A and the front wall 261A and between the left side wall 263A and the front wall 262A on the top plate 264A of the chassis 250A.

The concave portion 253B provided at a corner between the front wall 261B and the left side wall 263B on the bottom plate 265B of the chassis 250B has a structure fitting to the above mentioned convex portion 254A. The concave portion 253B has an upper plate 274B and a rear wall 276B extending from the bottom plate 262B to the upper plate 274B. The concave portion 253B further has a side wall 272B extending vertically and upward from the bottom plate 265B and is bent in a direction opposite to the left side wall 262B and further extending vertically and upward to the top plate 274B again. The bent portion 258B is inclined upward in a direction from the front wall 261B to the rear wall 276B. A tapped hole 256B is provided on the rear wall 276B. The concave portion 253B provided at a corner between the front wall 261B and the right side wall 262B on the bottom plate 265B of the chassis 250B has a symmetric structure to the above mentioned concave portion.

Next, a method of coupling the chassis 151 and 152 will be described below.

The chassis 250B is first placed on the top plate 264A of the chassis 250A on a position displaced from the front wall 262A in the direction of the rear wall 264A. Then the chassis 152 is moved in a direction of the front wall 261A until the inclined bend portions 258B of the concave portions 253B fit to the corresponding inclined bent portions 258A of the convex portions 254A. After the convex portions 254A and the concave portions 253B are mated, the chassis 250A and the chassis 250B are coupled to each other by screws 255 passing through the holes 256A to the tapped holes 256B. Thereafter, a user goes to the rear side of the chassis 250A and 250B and fixes between the chassis 250A and 250B with screws 259 there, as shown in FIGS. 3A and 3B.

In the conventional chassis coupling and fixing structure described above, the chassis 250B needs to be moved in the direction of the front wall 261A of the chassis 250A. However, there is no guide on the top plate 264A of the chassis 250A and, therefore, there is a problem in that it is difficult to position the chassis 250B such that the concave portions 253b mates the convex portions 254A.

Moreover, in the conventional chassis coupling and fixing structure, there is another problem in that after the chassis 250A and 250B are coupled to each other with the screws 255 on the front wall 262A side, a person must go to the rear wall 266A side to fix the chassis 250A and 250B with the screws 259, resulting in worse workability.

Further, there is still another problem in that because the screws 259 need to screwed within the chassis on the rear wall side, a space for constituent elements to be mounted becomes small.

SUMMARY OF THE INVENTION

Therefore, the present invention has, as an object, to provide a chassis coupling and fixing structure having improved workability.

Another object of the present invention is to provide a chassis coupling and fixing structure in which chassis can be coupled and fixed at the front wall side of the chassis.

Still another object of the present invention is to provide a chassis coupling and fixing structure in which alignment of the chassis is easy.

In order to achieve an aspect of the present invention, a coupling and fixing structure for chassis, includes a positioning structure for positioning a first chassis relative to a second chassis, the first chassis having first coupling grooves provided in upper portions of the first chassis and extending from a front wall along side walls, respectively, the second chassis having second coupling grooves provided in lower portions of the second chassis and extending from a front wall along side walls, respectively, and coupling members inserted into pairs of the first coupling groove and the second coupling groove and coupled and fixed to both of the first chassis and the second chassis.

The coupling members desirably includes a plate portion extending in a longitudinal direction, a fixing flange extending perpendicular to the plate portion from one of ends of longitudinal directions of the plate portion, an upper coupling flange portion extending from a top edge of the plate portion along the longitudinal direction in an inner direction of the second chassis and having a first nail portion extending downward, and a lower coupling flange portion extending from a bottom edge of the plate portion along the longitudinal direction in an inner direction of the first chassis and having a second nail portion extending upward.

The nail portion may extend downward and have a length shorter in a direction opposite to the fixing flange.

The positioning structure desirably includes pole-shaped convex sections provided on one of the first and second chassis, and pole-shaped concave sections provided on the other of the first and second chassis in correspondence with the convex sections.

The positioning structure may includes one or more concave sections provided on one of the first and second chassis and extending in a direction from a front wall to a rear wall of the one chassis, and one or more convex sections provided on the other of the first and second chassis and extending in a direction from a front wall to a rear wall of the other chassis in correspondence with the concave sections. Or, the positioning structure may includes a concave section provided on one of the first and second chassis, and extending in a direction from a front wall to a rear wall of the one chassis, and the concave section having a cover plate extending from a middle portion of the concave section to an end on a rear wall side of the one chassis to form a surrounded space, and a convex section provided on the other of the first and second chassis, extending in a direction from a front wall to a rear wall of the other chassis, and having a notched portion provided on the rear wall side of the convex section and corresponding to the cover plate. In this case, the notched portion of the convex section is inserted into the surrounded space of the concave section.

In order to achieve another aspect of the present invention, a method of coupling and fixing a first chassis and a second chassis, includes the steps of:

positioning the first chassis relative to the second chassis; and inserting coupling members into pairs of first and second coupling grooves, respectively, wherein the first chassis having the first coupling grooves provided in upper portions of the first chassis and extending from a front wall along side walls, respectively, and wherein the second chassis having second coupling grooves provided in lower portions of the second chassis and extending from a front wall along side walls, respectively; and fixing the coupling members to both of the first chassis and the second chassis.

BRIEF DESCRIPTION OF THE DRAWINGS

FIG. 6 is a partial expanded perspective view showing a coupling member for coupling the chassis in the structure shown in FIG. 4;

FIG. 7 is a partial expanded perspective view showing a coupling member for coupling the chassis in a modification of structure shown in FIG. 4;

FIG. 10 is a partial perspective view showing the chassis on the upper side in the structure shown in FIG. 8.

DESCRIPTION OF THE PREFERRED EMBODIMENTS

A chassis coupling and fixing structure according to the present invention will be described below in detail with reference to the accompanying drawings.

Figure 1:
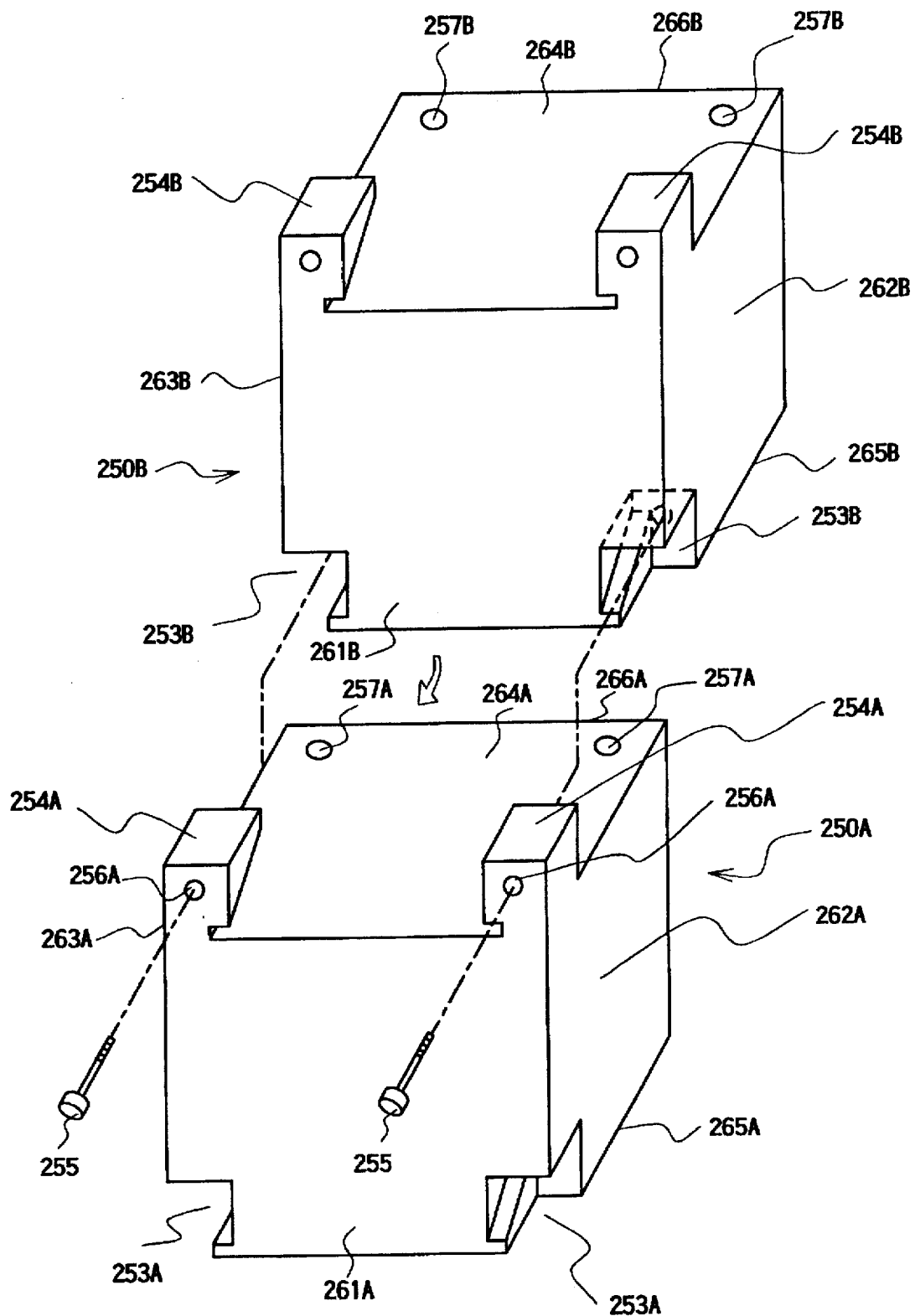
FIG. 1 is a perspective view showing a conventional chassis coupling and fixing structure.
Figure 2:
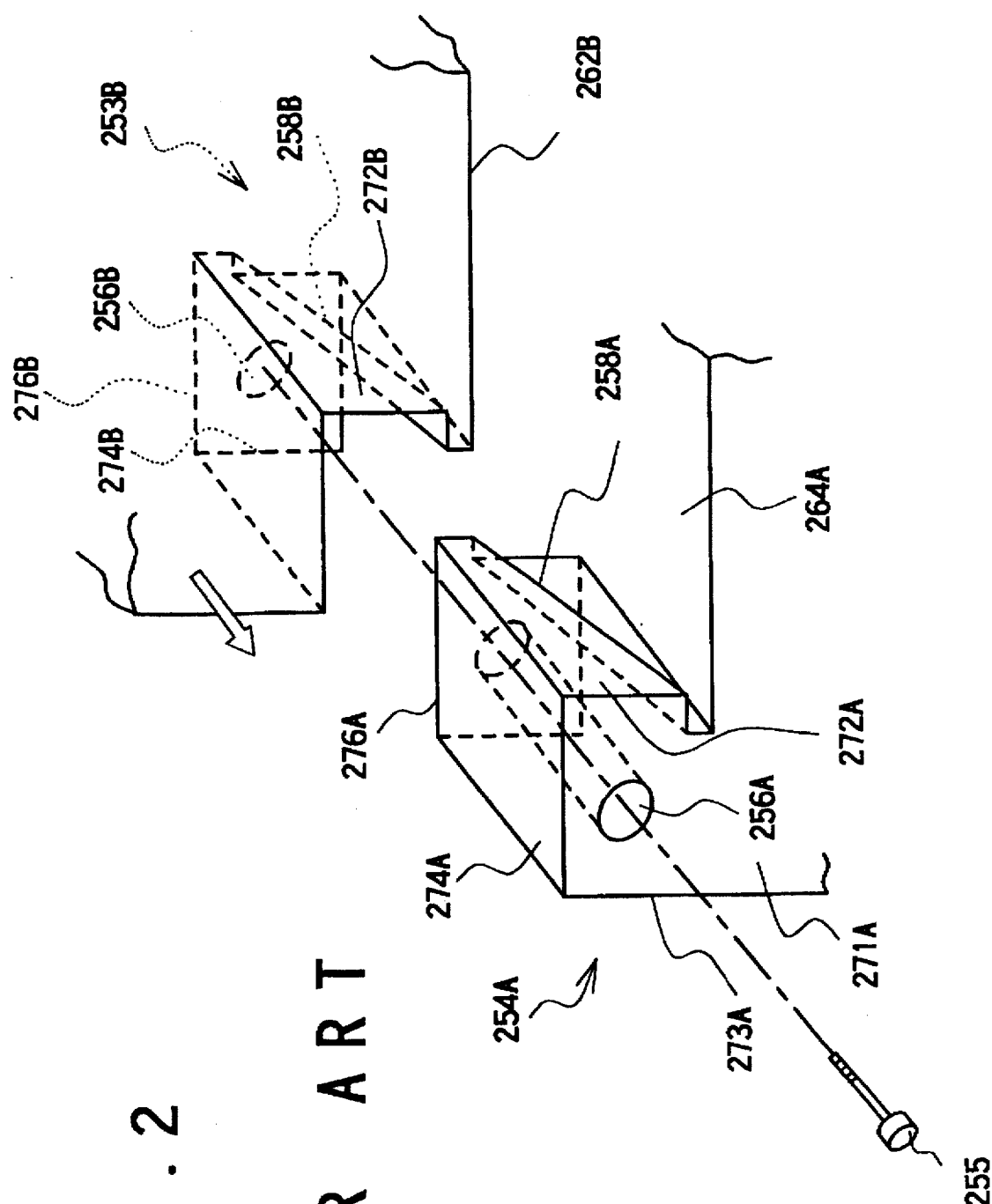
FIG. 2 is a partial expanded perspective view showing a convex portion and a concave portion of the structure shown in FIG. 1.
Figure 3A:
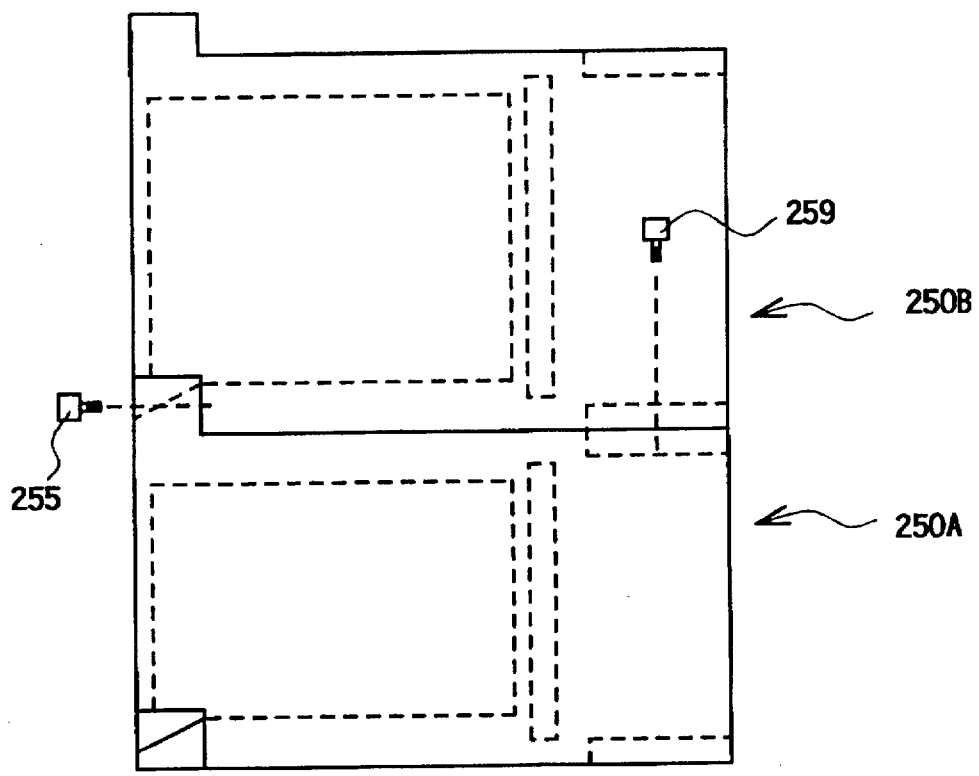
FIGS. 3A and 3B are views showing the conventional structure shown in FIG. 1 from the side of the right side wall side and the side of the rear wall, respectively.
Figure 3B:
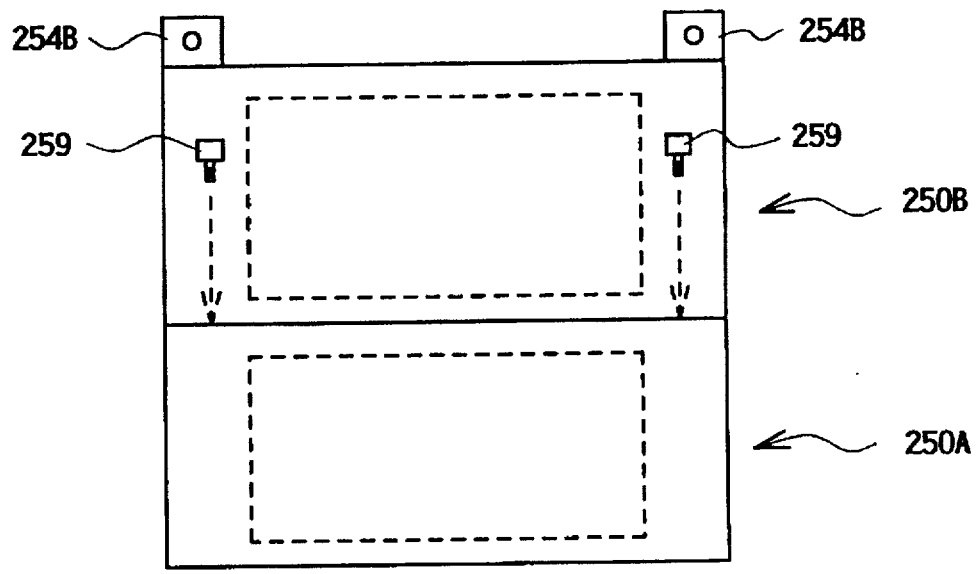
Figure 4:
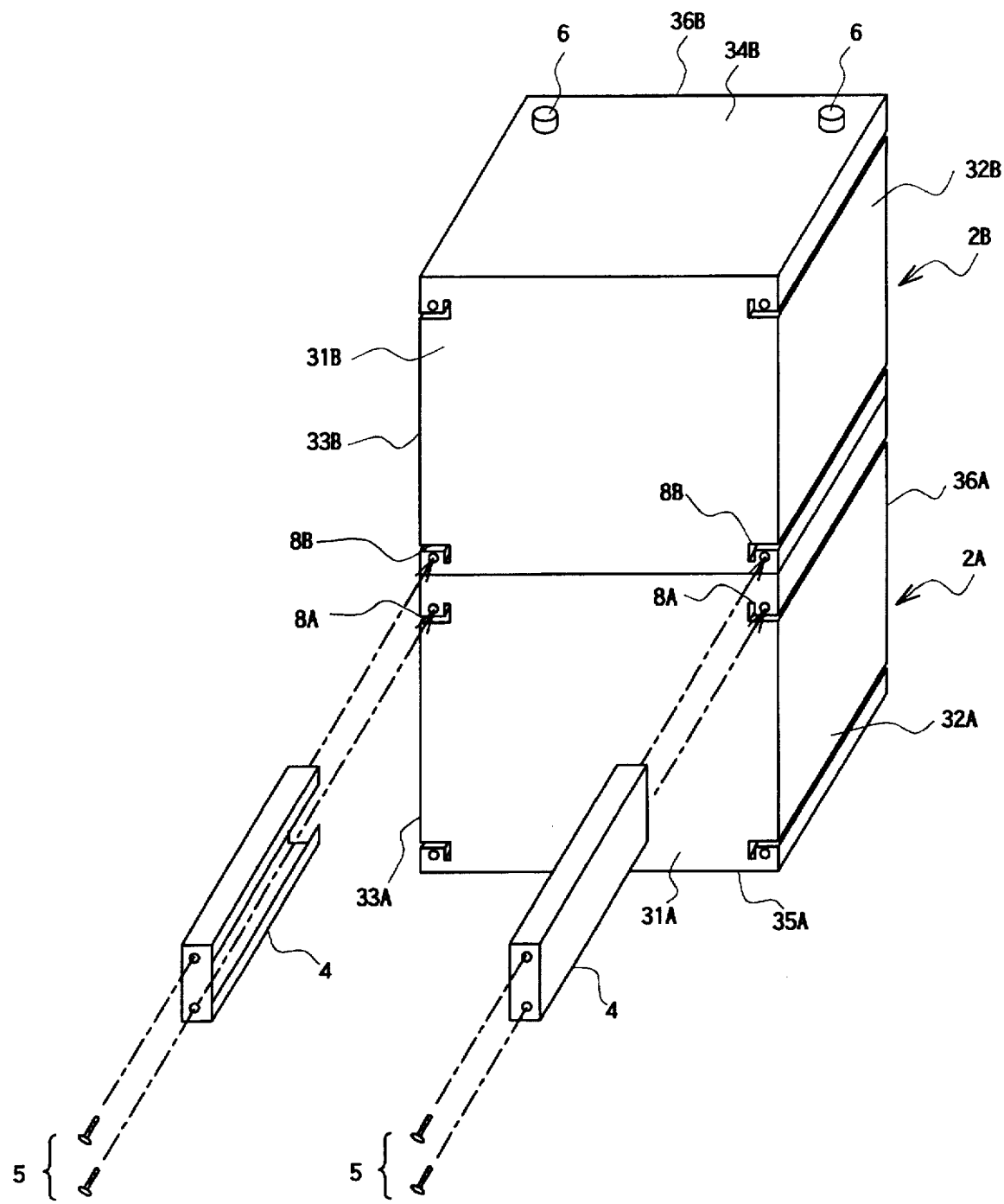
FIG. 4 is a perspective view from a front upper right point showing a chassis coupling and fixing structure according to an embodiment of the present invention.
Figure 5:
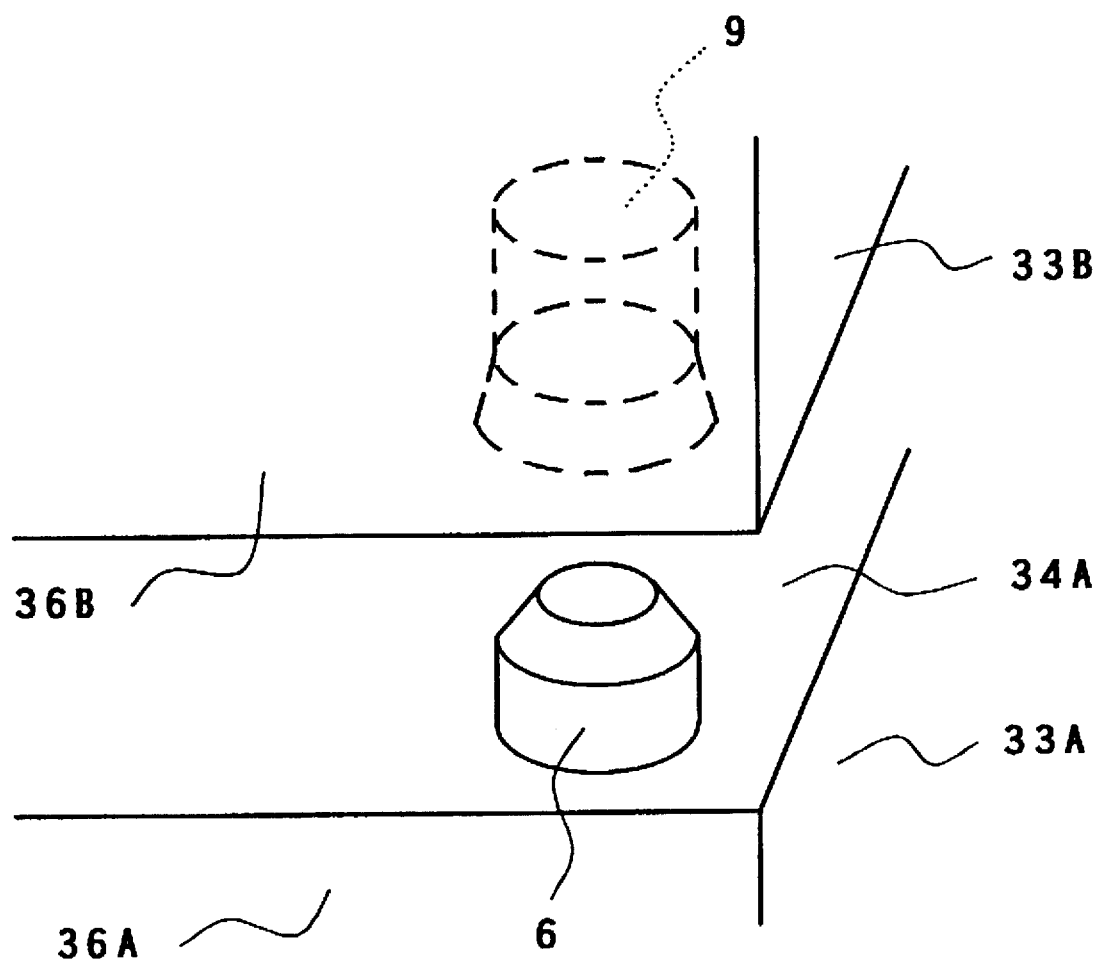
FIG. 5 is a partial expanded perspective view showing positioning sections of the chassis in the structure shown in FIG. 4.

FIG. 4 is a perspective view showing the chassis coupling and fixing structure according to an embodiment of the present invention. FIG. 5 is a partial expanded perspective view showing alignment between the chassis, and FIG. 6 is a partial expanded perspective view of a coupling section.

First, referring to FIG. 4, there are provided two chassis 2A and 2B which have front walls 31A and 31B, right side walls 32A and 32B, left side walls 33A and 33B, top plates 34A and 34B, bottom plates 35A and 35B, and rear walls 36A and 36B, respectively.

As shown in FIG. 5, each of the chassis includes with two convex portions 6 provided on end portions of the top plate 34A (34B) of the chassis 2A (2B) in a horizontal direction on the side of the rear wall 36A (36B) and extending vertically and upward, respectively. Each of the convex portions 6 is a shape of cylindrical pole and has a small circular flat plate at the top portion of the cylindrical pole has and a tapered portion connected to the small circular plate. Each of the chassis further includes two concave portions 7 provided on end portions of the bottom plate 35A (35B) of the chassis 2A (2B) on the side of the rear wall 36A (36B) in correspondence to the convex portions 6 and extending vertically and upward, respectively. Each of the concave portions 7 has a shape of cylindrical pole which has a diameter somewhat greater than that of the convex portion 6. The concave portion 7 has a tapered portion which is spread toward the bottom plate.

Moreover, each of the chassis includes coupling grooves 8A (8B) formed on upper and lower and portions of each chassis on the both sides. The coupling groove is of an L-like shape and penetrates from the front wall 31A (31B) to the rear wall 36A (36B). The coupling groove provided in the upper portion extends in a direction perpendicular to the side wall 32A or 33A (32B or 33B) and in an inner direction of the chassis and then extends upward. The coupling groove provided in the lower portion extends in a direction perpendicular to the side wall 32A or 33A (32B or 33B) and in an inner direction of the chassis and then extends downward. The coupling groove in the upper portion and the coupling groove in the lower portion constitute a pair on each side of the side walls 32A and 32B (33A and 33B). Each chassis 2A (2B) has four tapped holes 22 at all the corners of the front wall 31A (31B).

The chassis coupling and fixing structure includes a coupling members 4. Each of the coupling members 4 has a length equal to the width of the side wall 32A (32B) or 33A (33B). Each of the coupling members 4 has a rectangular plate 12, and a flange 18 with two screw holes 20 extending from one of longitudinal edges of the plate 12 in a direction perpendicular to the plate 12, i.e., in an inner direction of the chassis. The screw holes 20 are provided on the positions corresponding to the tapped holes 22 of the chassis 2A and 2B and used for fixing the coupling member to the chassis 2A and 2B with screws 5. The coupling member 4 further includes an upper flange 14U extending from the upper edge of the plate 12 in a direction perpendicular to the plate 12, i.e., in then inner direction of the chassis and having a nail portion 16U which extends downward from the tip edge of the flange 14U and a lower flange 14L extending from the lower edge of the plate 12 in a direction perpendicular to the plate 12, i.e., in the inner direction of the chassis and having a nail portion 16L which extends upward from the tip edge of the flange 14L. The shape of the upper flange 14U with the nail portion 16U or the lower flange 14L with the nail portion 16L corresponds to that of the coupling groove 8A (8B). The coupling member 4, specifically, the nail portions 16U and 16L act to prevent the chassis 2A and 2B from being separated.

Next, the method of coupling and fixing the chassis to each other will be described below.

First, the chassis 2B is placed on the chassis 2A such that the concave portions 9 of the chassis 2B engage with the convex portions 6 of the chassis 2A, respectively. Next, the coupling members 4 are inserted into the pair of coupling grooves 8A and 8B of the chassis 2A and 2B from the side of the front wall 31A and 31B until the flange 18 contacts the front walls 31A and 31B or the longitudinal tip edge of the coupling member 4 reaches the rear walls 36A and 36B. Then, the coupling members 4 are fixed to the chassis 2A and 2B through the holes 20 and the tapped holes 22 with screws 5. As a result, the chassis are made unitary.

As described above, according to the chassis coupling and fixing structure of the present invention, the chassis 2B can be readily positioned on the chassis 2A because the convex portions 6 with the tapered portions function as a guide for the concave portions 9 with the tapered portions. Further, the coupling and fixing of the chassis 2A and 2B can be performed at the front wall 31A and 31B side without going to the rear wall side because the coupling member 4 is inserted into the coupling grooves 8A and 8B from the front wall side. Therefore, the chassis needs to be not designed to have a space for tool operation within the chassis. Consequently, because the extra space for fixing the chassis is not required, the size of the chassis can be reduced and the good workability can be achieved together with less work time.

Next, a modification of coupling and fixing structure according to in the above embodiment will be described below with reference to FIG. 7. In this embodiment, a coupling member 4-1 has nail portions 16U-1 and 16L-1 each of which has vertical length inclined from the flange 18 toward the edge portion opposite to the flange 18 such that it becomes shorter. The chassis 2A and 2B have the same coupling grooves 8A and 8B as shown in FIG. 4. However, portions of the coupling grooves 8A and 8B extending vertically upward and downward are formed to have shapes corresponding to the nail portions 16U-1 and 16L-1. This coupling member 4-1 is inserted into the coupling grooves 8A and 8B and fixed to the chassis 2A and 2B with the screws 5, similar to the above embodiment. In this manner, the coupling member 4-1 can be rigidly engaged with the chassis 2A and 2B.

Figure 8A:
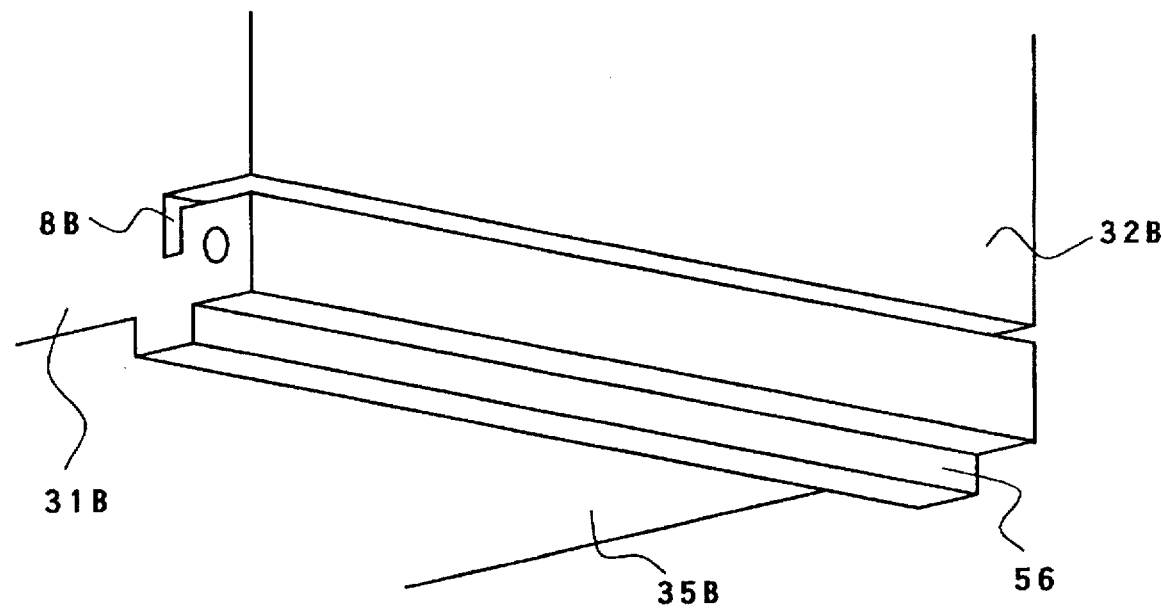
FIG. 8A is a perspective view from a rear lower right point showing an upper chassis of a chassis coupling and fixing structure according to another embodiment of the present invention.
Figure 8B:
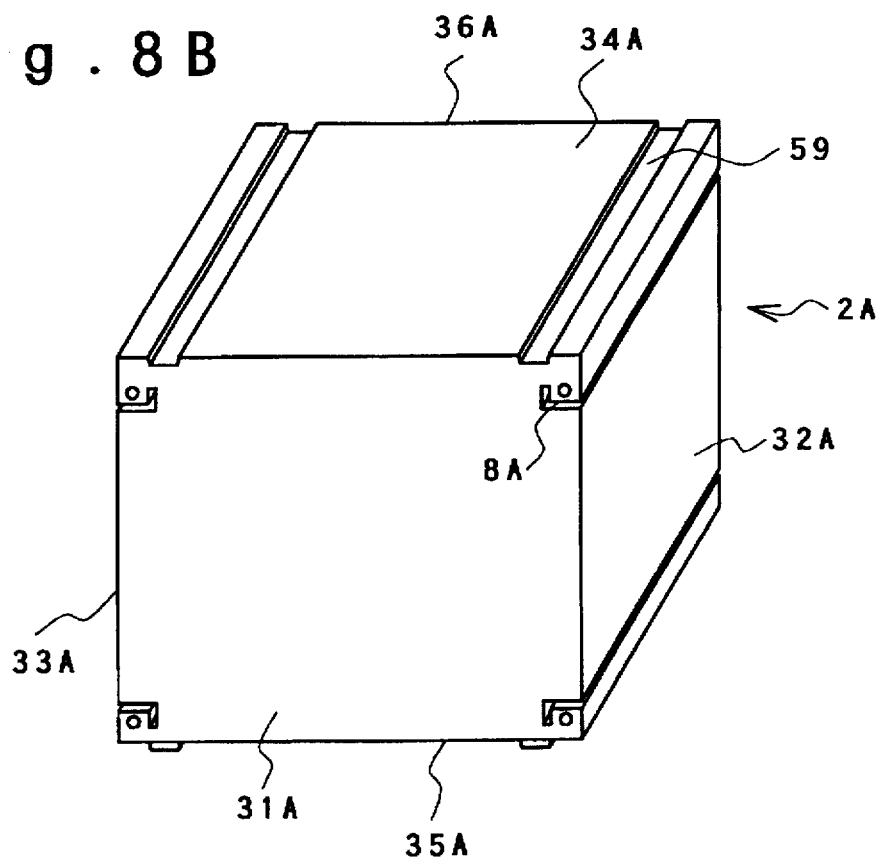
FIG. 8B is a perspective view from a rear upper right point showing a lower chassis of a chassis coupling and fixing structure according to another embodiment of the present invention.

Next, the chassis coupling and fixing structure according to another embodiment of the present invention will be described below with reference to FIGS. 8A and 8B. In the above embodiment shown in FIG. 4, there are provided the convex portions 6 and for the concave portions 9 for positioning the chassis 2B on the chassis 2A. However, in this embodiment, convex portions 56 and concave portion 59 are respectively provided on the chassis 2B and 2A such that they are fit to each other, in place of the convex portions 6 and the concave portions 9. The convex portions 56 extend from the front wall 31B to the rear wall 36B along the side walls 32B and 33B, as shown in FIG. 8A. The concave portions 59 extend from the front wall 31A to the rear wall 36A along the side walls 32A and 33A in corresponding to the convex portions 56, as shown in FIG. 8B. The chassis 2A and 2B have the same coupling grooves 8A and 8B as shown in FIG. 4. The coupling members 4 shown in FIG. 4 are also used in this embodiment.

In coupling and fixing the chassis 2A and 2B, the chassis 2B is first placed on the chassis 2A on the front side of the chassis 2A and the convex portions 56 are engaged with the convex portions 59 by moving the chassis 2B in right and left directions. Then, the chassis 2B is moved in a direction of the rear wall 36A of the chassis 2A. Next, the same coupling members 4 as shown in FIG. 4 are inserted into the coupling grooves of the chassis 2A and 2B and then fixed to the chassis 2A and 2B with the screws 5. In this manner, in this embodiment, the chassis 2B can be more readily positioned on the chassis 2A.

Figure 9A:
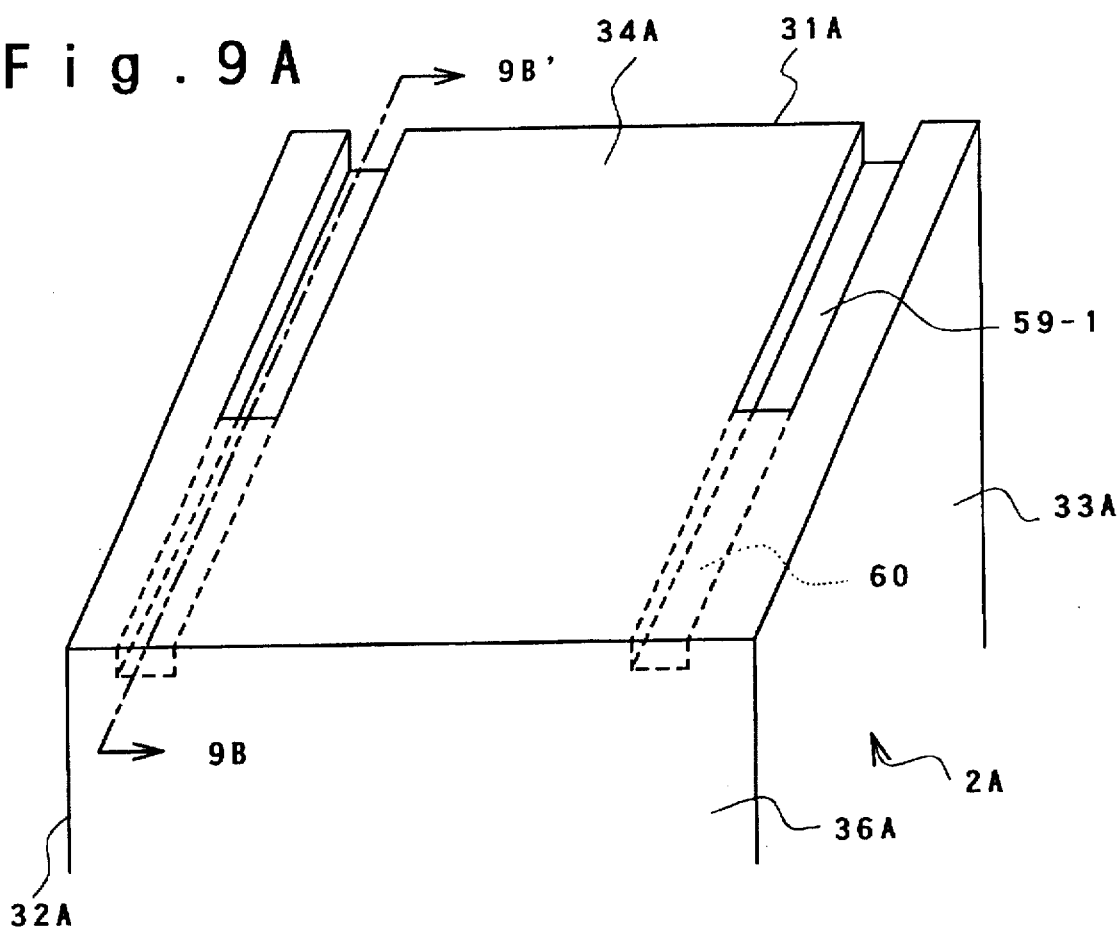
FIG. 9A is a perspective view showing a chassis coupling and fixing structure according to still another embodiment of the present invention.
Figure 9B:
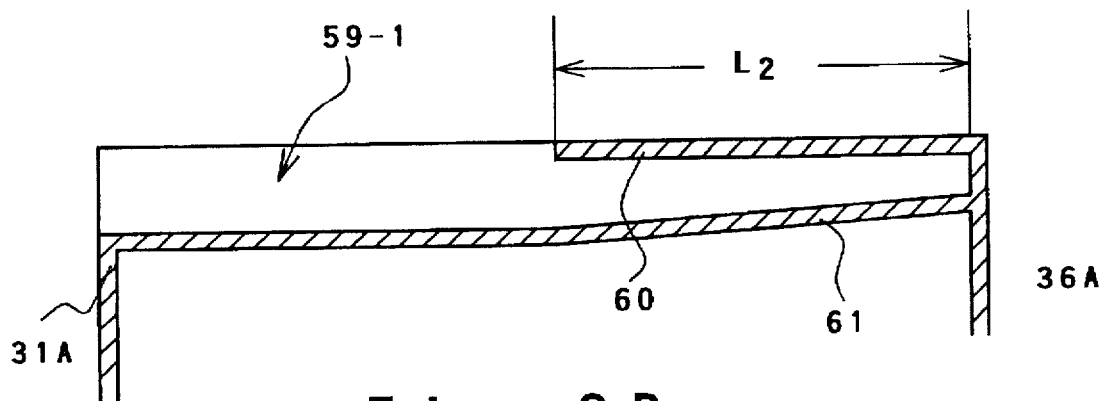
FIG. 9B is a cross sectional view showing the chassis on the lower side in the structure shown in FIG. 8.

Next, the chassis coupling and fixing structure according to another embodiment of the present invention will be described below with reference to FIGS. 9A to 10. Referring to FIGS. 9A and 9B, the concave portions 59-1 are provided on the top plate 34A of the chassis 2A, similarly to the above embodiment. However, a part of each of the concave portions 59-1 on the rear wall 36A side is covered with cover plates 60. Also, the concave portions 59-1 are formed to have a tapered portion 61 of a length L2 from a middle portion to the tip edge.

Next, referring to FIG. 10, the convex portions 56-1 are provided on the bottom plate 36B of the chassis 2B, similar to the above embodiment. However, the convex portions 56-1 have notched portions 70 from a middle portion to the end portion near the rear wall 36B corresponding to the cover plates 60 on the top plate 34A of the chassis 2A. Also, the convex portions 56-1 have tapered portions 66 of a length L2 from a middle portion to the edge portion near the rear wall 36B and the tapered portions 66 corresponds to the tapered portions 61 of the chassis 2A. The chassis 2B has coupling grooves 8B-1 of a length L1 each of which extends in a direction perpendicular to the side wall 32B or 33B and in an inner direction of the chassis 2B and then extends downward. Also, the coupling grooves 8B-1 extend from the front wall 31B to a middle portion in a direction of the rear wall 36B. The chassis 2A has coupling grooves 8A-1 (not shown) having a symmetrical shape to the coupling grooves 8B-1 at two upper portions of the chassis 2A. The coupling member has a length L1 and the basic structure is the same as that shown in FIG. 4.

In coupling and fixing the chassis 2A and 2B, the chassis 2B is first placed on the chassis 2A on the front side of the chassis 2A. Then the chassis 2B is moved in a right and left directions such that the convex portions 56-1 are fit to the convex portions 59-1. Subsequently, the chassis 2B is moved or slid in a direction of the rear wall 36A of the chassis 2A, so that protrusion portions of the convex portions 56-1 are inserted into the spaces surrounded by the cover plates 60 and the tapered portions 61. As a result, the convex portions 56-1 are rigidly engaged with the concave portions 59-1, respectively. Next, the same coupling members 4-1, each of which has the same shape as shown in FIG. 4 but a shorter length of L1, are inserted into the coupling grooves 8A-1 and 8B-1 of the chassis 2A and 2B and then fixed to the chassis 2A and 2B with the screws 5. In this manner, in this embodiment, the chassis 2B can be more readily positioned on the chassis 2A.

In this embodiment, the chassis 2B is fixed to the chassis 2A at the side walls by means of the notch portions and the spaces formed by the cover plates 60 and the tapered portions at the rear wall side of the chassis 2B and at the rear portions by means of the coupling grooves and the coupling members at the front wall side. Therefore, the chassis 2A and 2B can be made unitary without reducing the workability.

What is claimed is:

1. A coupling and fixing structure incorporated in chassis, for assembling together a first chassis and a second chassis, comprising:

a positioning structure integral to said first chassis and complementing a positioning structure integral to said second chassis;

said first chassis having first elongated coupling grooves provided in upper portions of said first chassis and extending from a front wall along side walls, respectively said coupling grooves having an L-shaped cross-section;

said second chassis having second elongated coupling grooves provided in lower portions of said second chassis and extending from a front wall along side walls, respectively said coupling grooves having an L-shaped cross-section; and elongated coupling members inserted into pairs of said first coupling groove and said second coupling groove and coupled and fixed to both of said first chassis and said second chassis said coupling members having extended portions which complement said L-shaped cross-sections of said coupling grooves, wherein each of said coupling members includes:

a plate portion extending in a longitudinal direction;

a fixing flange extending perpendicular to said plate portion from one of ends of longitudinal directions of the plate portion;

an upper coupling flange portion extending from a top edge of said plate portion along the longitudinal direction in an inner direction of said second chassis and having a first nail portion extending downward; and a lower coupling flange portion extending from a bottom edge of said plate portion along the longitudinal direction in an inner direction of said first chassis and having a second nail portion extending upward, and wherein said first and second coupling grooves having shapes corresponding to said lower and upper coupling flanges.

2. A coupling and fixing structure incorporated in chassis, for assembling together a first chassis and a second chassis, comprising:

a positioning structure integral to said first chassis and complementing a positioning structure integral to said second chassis;

said first chassis having first elongated coupling grooves provided in upper portions of said first chassis and extending from a front wall along side walls, respectively said coupling grooves having an L-shaped cross-section;

said second chassis having second elongated coupling grooves provided in lower portions of said second chassis and extending from a front wall along side walls, respectively said coupling grooves having an L-shaped cross-section; and elongated coupling members inserted into pairs of said first coupling groove and said second coupling groove and coupled and fixed to both of said first chassis and said second chassis said coupling members having extended portions which complement said L-shaped cross-sections of said coupling grooves, wherein each of said coupling members includes:

a plate portion extending in a longitudinal direction;

a fixing flange extending perpendicular to said plate portion from one of ends of longitudinal directions of the plate portion;

an upper coupling flange portion extending from a top edge of said plate portion along the longitudinal direction in an inner direction of said second chassis and having a first nail portion which extends downward and has a length shorter in a direction opposite to the fixing flange; and a lower coupling flange portion extending from a bottom edge of said plate portion along the longitudinal direction in an inner direction of said first chassis and having a second nail portion which extends upward and has a length shorter in a direction opposite to the fixing flange, and wherein said first and second coupling grooves having shapes corresponding to said lower and upper coupling flanges.

3. The coupling and fixing structure according to claim 2, wherein said positioning structure comprises:

pole-shaped convex sections provided on one of said first and second chassis; and pole-shaped concave sections provided on the other of said first and second chassis in correspondence with said convex sections.

4. The coupling and fixing structure according to claims 1 or 2, wherein said positioning structure comprises:

at least one concave section provided on one of said first and second chassis and extending in a direction from a front wall to a rear wall of said one chassis; and at least one convex section provided on the other of said first and second chassis and extending in a direction from a front wall to a rear wall of said other chassis in correspondence with said concave sections.

5. A coupling and fixing structure incorporated in chassis, for assembling together a first chassis and a second chassis, comprising:

a positioning structure integral to said first chassis and complementing a positioning structure integral to said second chassis;

said first chassis having first elongated coupling grooves provided in upper portions of said first chassis and extending from a front wall along side walls, respectively said coupling grooves having an L-shaped cross-section;

said second chassis having second elongated coupling grooves provided in lower portions of said second chassis and extending from a front wall along side walls, respectively said coupling grooves having an L-shaped cross-section; and elongated coupling members inserted into pairs of said first coupling groove and said second coupling groove and coupled and fixed to both of said first chassis and said second chassis said coupling members having extended portions which complement said L-shaped cross-sections of said coupling grooves, wherein said positioning structure comprises:
at least one concave sections provided on one of said first and second chassis and extending in a direction from a front wall to a rear wall of said one chassis; and
at least one convex sections provided on the other of said first and second chassis and extending in a direction from a front wall to a rear wall of said other chassis in correspondence with said concave sections, wherein each of said coupling members includes:
a plate portion extending in a longitudinal direction;
a fixing flange extending perpendicular to said plate portion from one of ends of longitudinal directions of the plate portion;
an upper coupling flange portion extending from a top edge of said plate portion along the longitudinal direction in an inner direction of said second chassis and having a first nail portion extending downward; and
a lower coupling flange portion extending from a bottom edge of said plate portion along the longitudinal direction in an inner direction of said first chassis and having a second nail portion extending upward, and
wherein said first and second coupling grooves having shapes corresponding to said lower and upper coupling flanges.

6. A coupling and fixing structure incorporated in chassis, for assembling together a first chassis and a second chassis, comprising:

a positioning structure integral to said first chassis and complementing a positioning structure integral to said second chassis;

said first chassis having first elongated coupling grooves provided in upper portions of said first chassis and extending from a front wall along side walls, respectively said coupling grooves having an L-shaped cross-section;

said second chassis having second elongated coupling grooves provided in lower portions of said second chassis and extending from a front wall along side walls, respectively said coupling grooves having an L-shaped cross-section; and elongated coupling members inserted into pairs of said first coupling groove and said second coupling groove and coupled and fixed to both of said first chassis and said second chassis said coupling members having extended portions which complement said L-shaped cross-sections of said coupling grooves, wherein said positioning structure comprises:
at least one concave sections provided on one of said first and second chassis and extending in a direction from a front wall to a rear wall of said one chassis; and
at least one convex sections provided on the other of said first and second chassis and extending in a direction from a front wall to a rear wall of said other chassis in correspondence with said concave sections, wherein each of said coupling members includes:
a plate portion extending in a longitudinal direction;
a fixing flange extending perpendicular to said plate portion from one of ends of longitudinal directions of the plate portion;
an upper coupling flange portion extending from a top edge of said plate portion along the longitudinal direction in an inner direction of said second chassis and having a first nail portion which extends downward and has a length shorter in a direction opposite to the fixing flange; and
a lower coupling flange portion extending from a bottom edge of said plate portion along the longitudinal direction in an inner direction of said first chassis and having a second nail portion which extends upward and has a length shorter in a direction opposite to the fixing flange, and
wherein said first and second coupling grooves having shapes corresponding to said lower and upper coupling flanges.

7. A coupling and fixing structure incorporated in chassis, for assembling together a first chassis and a second chassis, comprising:

a positioning structure integral to said first chassis and complementing a positioning structure integral to said second chassis;

said first chassis having first elongated coupling grooves provided in upper portions of said first chassis and extending from a front wall along side walls, respectively;

said second chassis having second elongated coupling grooves provided in lower portions of said second chassis and extending from a front wall along side walls, respectively; and elongated coupling members inserted into pairs of said first coupling groove and said second coupling groove and coupled and fixed to both of said first chassis and said second chassis;

wherein said positioning structure comprises:
a concave section provided on one of said first and second chassis, and extending in a direction from a front wall to a rear wall of said one chassis, and said concave section having a cover plate extending from a middle portion of said concave section to an end on a rear wall side of said one chassis to form a surround space; and
a convex section provided on the other of said first and second chassis, extending in a direction from a front wall to a rear wall of said other chassis, and having a notched portion provided on the rear wall side of said convex section and corresponding to the cover plate, said notched portion of said convex section being inserted into the surrounded space of said concave section.

8. The coupling and fixing structure according to claim 7, wherein each of said coupling members includes:

a plate portion extending in a longitudinal direction;

a fixing flange extending perpendicular to said plate portion from one of ends of longitudinal directions of the plate portion;

an upper coupling flange portion extending from a top edge of said plate portion along the longitudinal direction in an inner direction of said second chassis and having a first nail portion extending downward; and a lower coupling flange portion extending from a bottom edge of said plate portion along the longitudinal direction in an inner direction of said first chassis and having a second nail portion extending upward, and wherein said first and second coupling grooves have shapes corresponding to said lower and upper coupling flanges.

9. A method of coupling and fixing a first chassis and a second chassis, comprising the steps of:

positioning said first chassis relative to said second chassis so that L-shaped cross-section first coupling grooves provided in said first chassis align with L-shaped cross-section second coupling grooves provided in said second chassis; and inserting coupling members into pairs of said first and second coupling grooves, respectively, wherein said first chassis having said first coupling grooves provided in upper portions of said first chassis and extending from a front wall along side walls, respectively, and wherein said second chassis having second coupling grooves provided in lower portions of said second chassis and extending from a front wall along side walls, respectively; and fixing said coupling members to both of said first chassis and said second chassis, wherein said positioning step comprises positioning said first chassis on said second chassis such that pole-shaped convex sections provided on one of said first and second chassis mate to pole-shaped concave sections provided on the other of said first and second chassis.

10. A method of coupling and fixing a first chassis and a second chassis, comprising the steps of:

positioning said first chassis relative to said second chassis so that L-shaped cross-section first coupling grooves provided in said first chassis align with L-shaped cross-section second coupling grooves provided in said second chassis; and inserting coupling members into pairs of said first and second coupling grooves, respectively, wherein said first chassis having said first coupling grooves provided in upper portions of said first chassis and extending from a front wall along side walls, respectively, and wherein said second chassis having second coupling grooves provided in lower portions of said second chassis and extending from a front wall along side walls, respectively; and fixing said coupling members to both of said first chassis and said second chassis, wherein said positioning step comprises positioning said first chassis on said second chassis such that a concave section provided on one of said first and second chassis and extending in a direction from a front wall to a rear wall of said one chassis mate to a convex section provided on the other of said first and second chassis and extending in a direction from a front wall to a rear wall of said other chassis in correspondence with said concave sections.

11. A method of coupling and fixing a first chassis and a second chassis, comprising the steps of:

positioning said first chassis relative to said second chassis; and inserting coupling members into pairs of first and second coupling grooves, respectively, wherein said first chassis having said first coupling grooves provided in upper portions of said first chassis and extending from a front wall along side walls, respectively, and wherein said second chassis having second coupling grooves provided in lower portions of said second chassis and extending from a front wall along side walls, respectively; and fixing said coupling members to both of said first chassis and said second chassis;

wherein said positioning step comprises:

placing said first chassis on said second chassis such that a concave section provided on one of said first and second chassis, and extending in a direction from a front wall to a rear wall of said one chassis, and said concave section having a cover plate extending from a middle portion of said concave section to an end on a rear wall side of said one chassis to form a surrounded space mates to a convex section provided on the other of said first and second chassis, extending in a direction from a front wall to a rear wall of said other chassis, and having a notched portion provided on the rear wall side of said convex section and corresponding to the cover plate; and inserting said notched portion of said convex section being into the surrounded space of said concave section.

\* \* \* \* \*